(12) United States Patent
Zaveri

(10) Patent No.: US 11,858,013 B2
(45) Date of Patent: Jan. 2, 2024

(54) SYSTEM AND METHOD FOR AUTOMATIC AND SIMULTANEOUS COLORING OF MULTIPLE MOLDED OR 3-D PRINTED ARTICLES IN MULTIPLE SHAPES AND COLORS

(71) Applicant: Sahir Zaveri, Mumbai (IN)

(72) Inventor: Sahir Zaveri, Mumbai (IN)

( * ) Notice: Subject to any disclaimer, the term of this patent is extended or adjusted under 35 U.S.C. 154(b) by 524 days.

(21) Appl. No.: 16/402,207

(22) Filed: May 2, 2019

(65) Prior Publication Data

US 2020/0139411 A1     May 7, 2020

(51) Int. Cl.
| | |
|---|---|
| *B08B 3/12* | (2006.01) |
| *B05C 11/11* | (2006.01) |
| *B05C 9/14* | (2006.01) |
| *D06P 3/00* | (2006.01) |
| *B05C 3/05* | (2006.01) |
| *B33Y 40/20* | (2020.01) |
| *B05C 13/02* | (2006.01) |
| *B29C 64/35* | (2017.01) |
| *B29C 64/30* | (2017.01) |
| *D06P 5/20* | (2006.01) |
| *B29C 64/379* | (2017.01) |
| *D06P 1/92* | (2006.01) |
| *D06P 3/24* | (2006.01) |
| *D06P 1/38* | (2006.01) |
| *D06P 1/39* | (2006.01) |
| *B29C 71/00* | (2006.01) |
| *B05C 3/00* | (2006.01) |

(52) U.S. Cl.
CPC ............... *B08B 3/12* (2013.01); *B05C 3/005* (2013.01); *B05C 3/05* (2013.01); *B05C 9/14* (2013.01); *B05C 11/11* (2013.01); *B05C 13/02* (2013.01); *B29C 64/30* (2017.08); *B29C 64/35* (2017.08); *B29C 71/0009* (2013.01); *B33Y 40/20* (2020.01); *D06P 3/00* (2013.01); *B29C 64/379* (2017.08); *D06P 1/38* (2013.01); *D06P 1/39* (2013.01); *D06P 1/92* (2013.01); *D06P 3/001* (2013.01); *D06P 3/008* (2013.01); *D06P 3/24* (2013.01); *D06P 5/20* (2013.01); *D06P 5/2033* (2013.01)

(58) Field of Classification Search
CPC .......... B33Y 40/20; B05C 3/005; B05C 3/05; B05C 9/14; B05C 11/11; B05C 13/02; B29C 64/35; B29C 64/30; B29C 64/379; B29C 71/0009; B08B 3/12; D06P 3/00; D06P 3/001; D06P 3/008; D06P 3/24; D06P 1/38; D06P 1/39; D06P 1/92; D06P 5/20; D06P 5/2033
See application file for complete search history.

(56) References Cited

U.S. PATENT DOCUMENTS 6,713,125 B1 * 3/2004 Sherwood ........... B29C 71/0009
427/430.1

* cited by examiner

*Primary Examiner* — Amina S Khan

(57) ABSTRACT

In one aspect, a method for permeating color into components includes the step of placing substrates inside a carrier. The method includes the step of placing the carrier inside an ultrasonic cleaning tank of an ultrasonic cleaning machine. The method includes the step of performing an ultrasonic cleaning in the ultrasonic cleaning tank. After the ultrasonic cleaning, the method transports the carrier with a robotic arm to a washing tank. The method includes the step of inserting, with the robotic arm, the carrier into the washing tank and neutralizing a substrate with water in the washing tank. The method includes the step of feeding warm water into a channel of the washing tank up to a specified level. The method includes the step of steaming the washing tank for a specified steaming time.

5 Claims, 6 Drawing Sheets

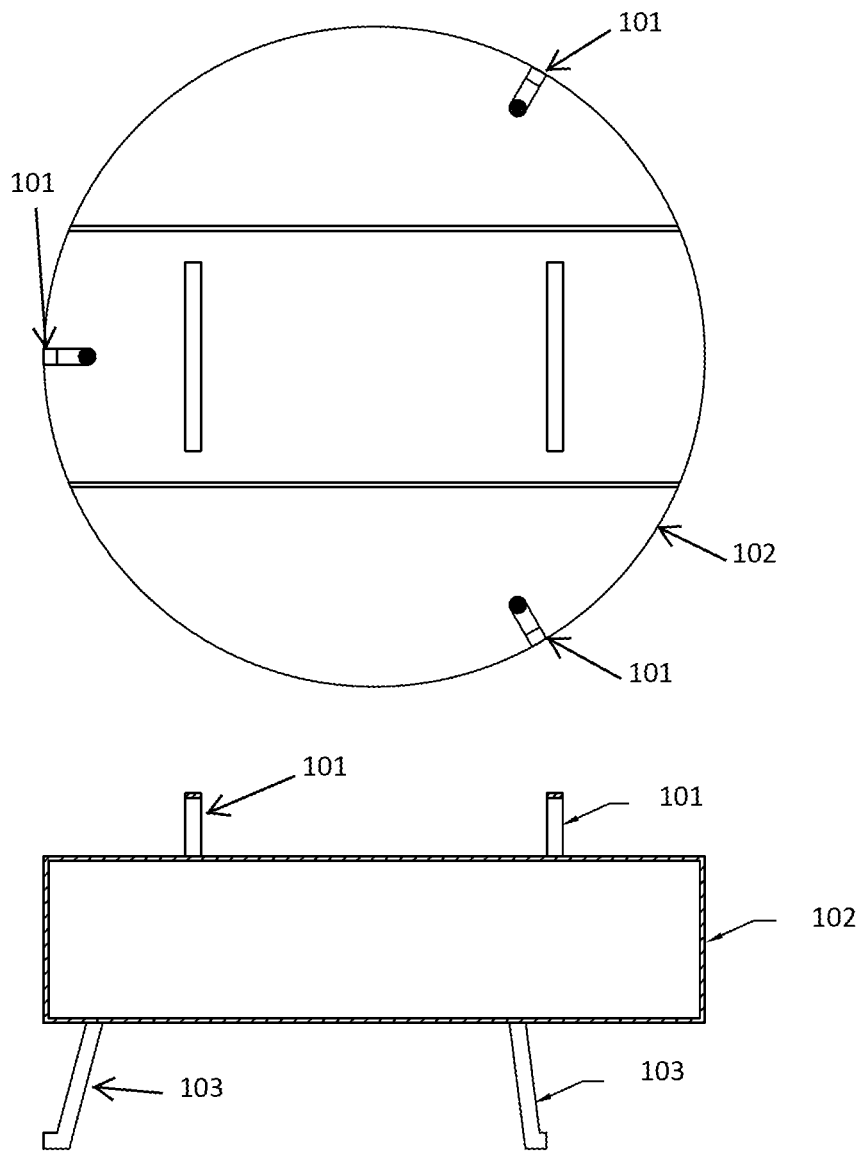
Fig - 1. Carrier

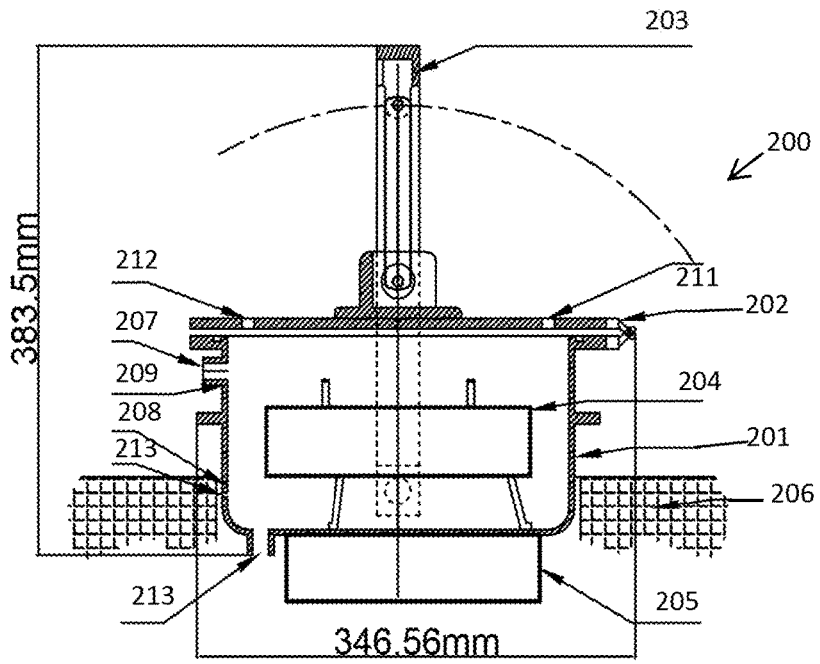
Fig - 2(a). Single Automated Colouring Unit
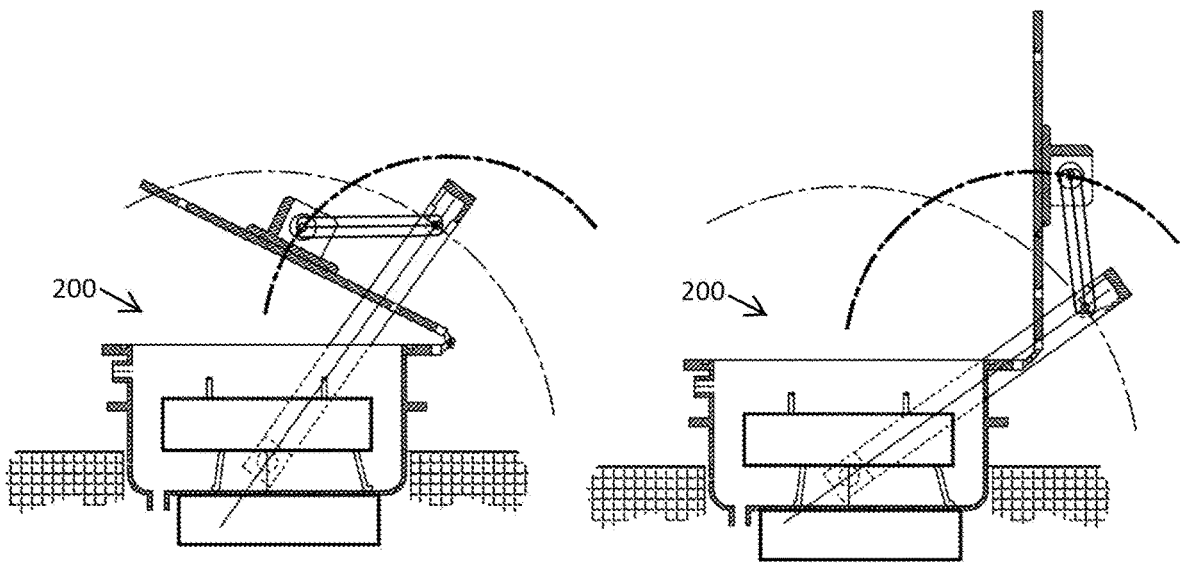
Fig - 2(b). Single Automated Colouring Unit slightly opened
Fig - 2(c). Single Automated Colouring Unit fully opened

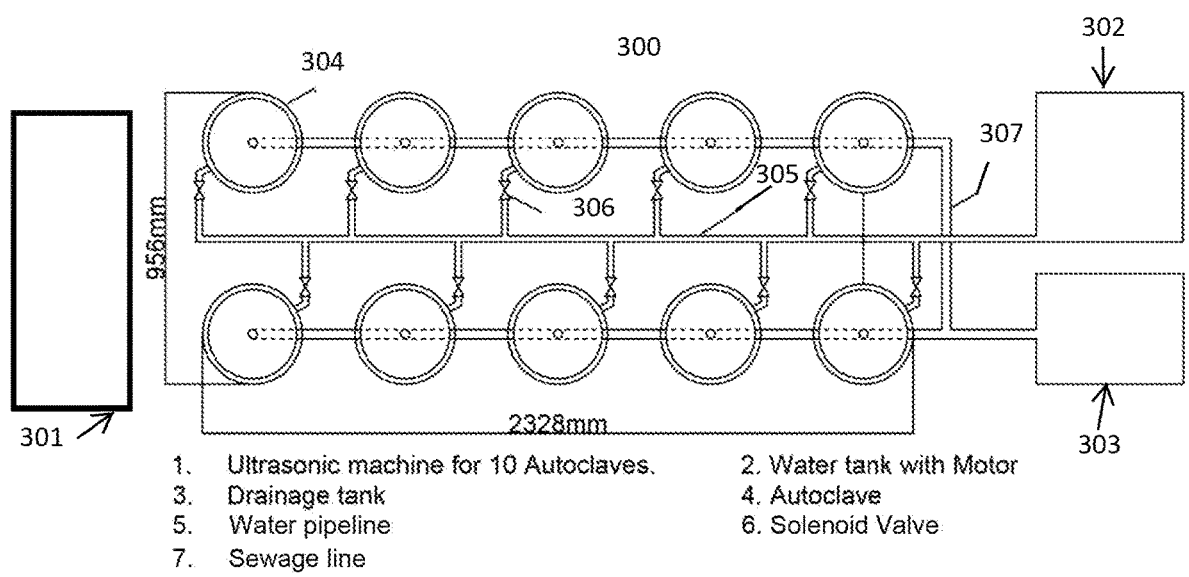
1. Ultrasonic machine for 10 Autoclaves.  2. Water tank with Motor
3. Drainage tank  4. Autoclave
5. Water pipeline  6. Solenoid Valve
7. Sewage line
Fig - 3. Cluster of 10 Autoclaves

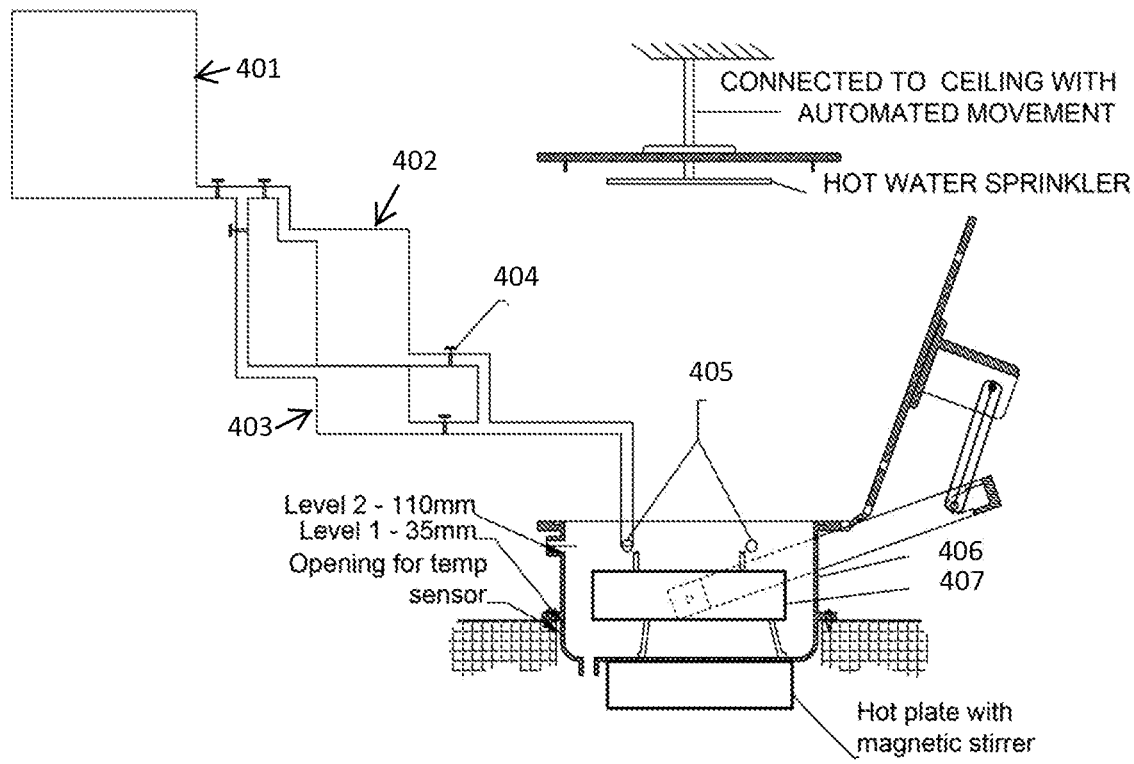
Fig - 4. Schematic of Feeding system

SYSTEM AND METHOD FOR AUTOMATIC AND SIMULTANEOUS COLORING OF MULTIPLE MOLDED OR 3-D PRINTED ARTICLES IN MULTIPLE SHAPES AND COLORS

CLAIM OF PRIORITY AND INCORPORATION BY REFERENCE

This application claims priority from Indian Patent Application No. 201821016851, filed May 3, 2018 and titled A SYSTEM AND METHOD FOR PERMEATING COLOR INTO COMPONENTS. This application is hereby incorporated by reference in its entirety for all purposes.

FIELD OF THE INVENTION

The present invention relates to a rapid proto-typing technique. More particularly, the present invention relates to a system and a method, which facilitates automatic and simultaneous coloring of multiple molded or 3-D printed articles in multiple shapes and colors.

DESCRIPTION OF THE RELATED ART

The technique of prototyping includes production of articles and small functional parts, structures, shells and molds directly from a computer-generated design. For example, a selective laser sintering process and a liquid-binder 3-D printing process are known in the art. Both the methods form successive thin cross-sections of the desired article. The individual cross-sections are formed by bonding together adjacent grains of a granular material on a generally planar surface of a bed of the granular material. Each layer is bonded to a previously formed layer, to form the desired three-dimensional article, at the same time as the grains of each layer are bonded together. The laser-sintering and liquid-binder techniques are advantageous, however, 3D printing can be quicker and less expensive than machining of prototype parts or production of cast or molded parts by conventional "hard" or 2 "soft" tooling techniques that can take anywhere between a few weeks to several months to complete, depending on the complexity of the item.

3D printing may also be useful in design-related fields for visualization and demonstration, and in fields where it is desirable to create mechanical prototypes. It may also be useful for making patterns for molding processes. Thus, owing to the various advantages associated with the 3-D printing technique, the present invention uses the said technique as the base technology, on which the inventive step which discloses a process that results in flexible yet scalable post processing of molded or printed parts is proposed. This process includes simultaneous coloring of various multiple molded parts or 3-D printed articles in multiple shapes and color. It is therefore an advantage that it has industrial applications when specific coloring is used for short run produced items. No prior art discloses a system for achieving multiple colors of 3D printed parts simultaneously. The technologies, which are known in the art, do not disclose a system for coloring of 3D printed parts, which is fully automated using a PLC controller and pre-prepared dyes to minimize human interaction, which is limited to loading parts and unloading finished parts. The present invention provides flexibility as it can be used with various types of dyes and to color various types of parts, since it is computer controlled.

SUMMARY

In one aspect, a method for permeating color into components includes the step of placing substrates inside a carrier. The method includes the step of placing the carrier inside an ultrasonic cleaning tank of an ultrasonic cleaning machine. The method includes the step of performing an ultrasonic cleaning in the ultrasonic cleaning tank. After the ultrasonic cleaning, the method transports the carrier with a robotic arm to a washing tank. The method includes the step of inserting, with the robotic arm, the carrier into the washing tank and neutralizing a substrate with water in the washing tank. The method includes the step of feeding warm water into a channel of the washing tank up to a specified level. The method includes the step of steaming the washing tank for a specified steaming time. The method includes the step of, after steaming, feeding the water up to another specified level. The method includes the step of adding a dyestuff with an inclined hopper. The method includes the step of, after the specified steaming time, cooling the solution. The method includes the step of, after cooling the solution, adding one or more dye color particles based on a set of specified shades and one more auxiliary agents, wherein the adding dye color particles is implemented under a specified low pressure for specified period of time-based on the dye color particles and the auxiliary.

BRIEF DESCRIPTION OF THE DRAWINGS

The present application can be best understood by reference to the following description taken in conjunction with the accompanying figures, in which like parts may be referred to by like numerals.

FIG. 1 discloses a carrier that can be used as a medium to carry the substrate or a part to be colored, according to some embodiments.

FIGS. 2 A-C discloses a view of a single automated coloring unit, according to some embodiments.

FIG. 3 illustrates an example cluster of ten (10) autoclaves, according to some embodiments.

FIG. 4 illustrates an example schematic of feeding system, according to some embodiments.

Figure 5:
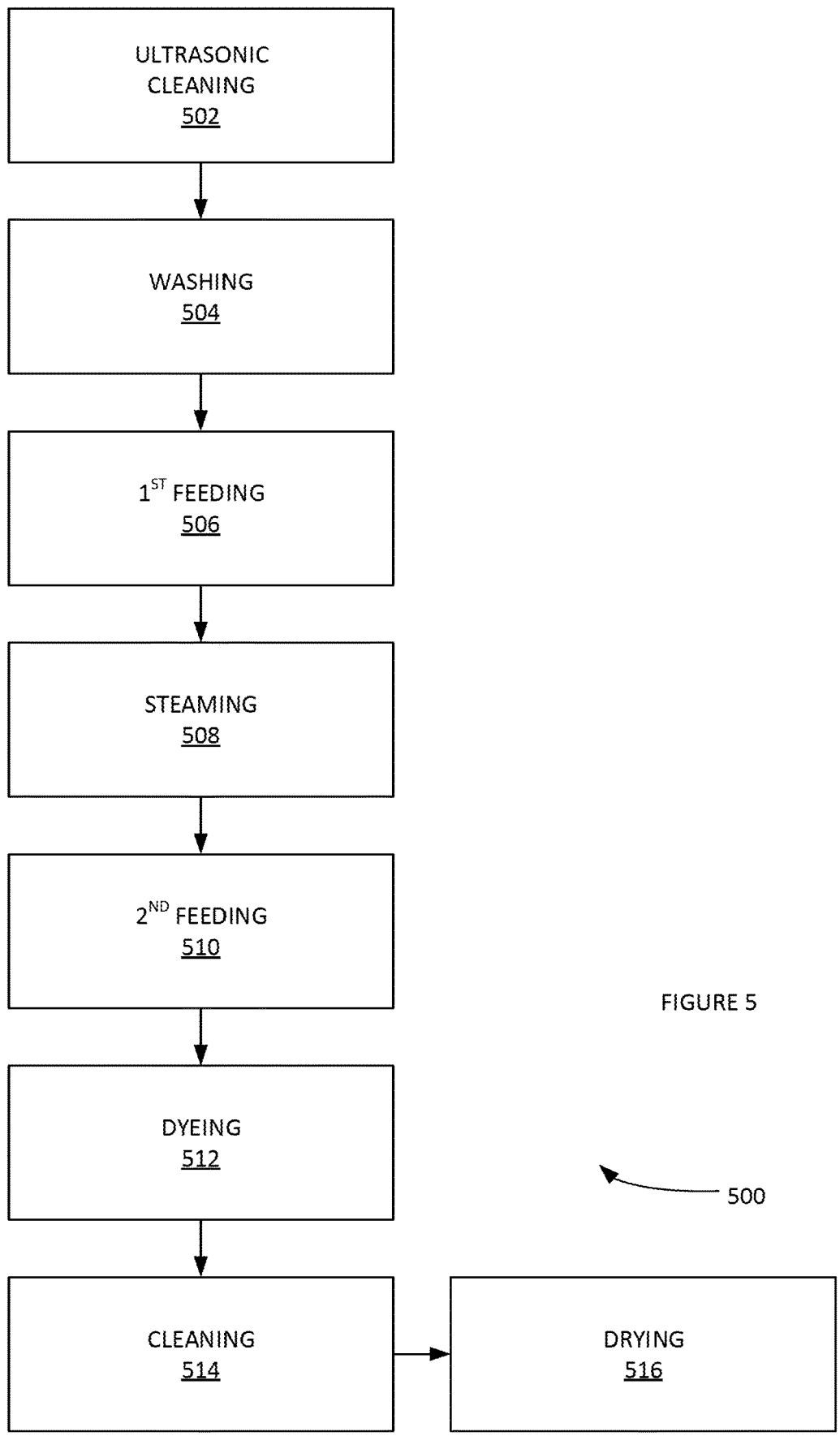
FIG. 5 illustrates an example process for permeating color into components, according to some embodiments.

The Figures described above are a representative set, and are not an exhaustive with respect to embodying the invention.

DESCRIPTION

Disclosed are a system, method, and article of manufacture of automatic and simultaneous coloring of multiple molded or 3D printed articles in multiple shapes and colors. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Autoclave is a pressure chamber used to carry out industrial processes using elevated temperature and pressure different from ambient air pressure.

Programmable logic controller (PLC) is an industrial digital computer which has been ruggedized and adapted for the control of manufacturing processes.

Polyamide 11 (PA 11) is a polyamide, bioplastic and a member of the nylon family of polymers produced by the polymerization of 11-aminoundecanoic acid.

Polyamide 12 is a polymer with the formula [(CH2)11C (O)NH]n. Polyamide 12 is made from w-aminolauric acid or laurolactam monomers that each have 12 carbons.

Pound per square inch (psi) is a unit of pressure or of stress based on avoirdupois units. It is the pressure resulting from a force of one pound-force applied to an area of one square inch. In SI units, one (1) psi is approximately equal to 6895 N/m2.

Sintering is the process of compacting and forming a solid mass of material by heat or pressure without melting it to the point of liquefaction.

Selective laser sintering (SLS) is an additive manufacturing (AM) technique that uses a laser as the power source to sinter powdered material (e.g. nylon/polyimide), aiming the laser automatically at points in space defined by a 3D model, binding the material together to create a solid structure.

Solenoid valve is an electromechanical device in which the solenoid uses an electric current to generate a magnetic field and thereby operate a mechanism which regulates the opening of fluid flow in a valve.

3D is three-dimensional space.

Ultrasonic transducer is a type of acoustic sensor that can include, inter alia: transmitters (convert electrical signals into ultrasound), receivers (receivers convert ultrasound into electrical signals) and transceivers (transceivers can both transmit and receive ultrasound).

Exemplary Systems

An example system for permeating color into the components can include, inter alia: an ultrasonic cleaning tank, an autoclave, carrier, a lid assembly, a robotic system, an ultrasonic transducer, a thermocouple, a pressure transducer or indicator, a water level indicator, a solenoid valve, a pressure relief valve, a gaskets, pumps, piping assembly, a water tank, nozzles, a pneumatic cylinder, PLC, band heater with insulating jackets and non-return valve.

FIG. 1 discloses a carrier (e.g. carrier 204 infra), which can be used as a medium to carry the substrate or a part, which is to be colored. As disclosed, said carrier comprises of a perforated body 103, handles 101 and legs 102. The perforated body 103 is designed in such a fashion that it can retain the substrate/part, which is to undergo color permeation. The designing of the body is such that it safely retains the part and also facilitates permeation of color on the same. The said carrier can be operated using handles 101 and its movement is facilitated by legs 102, which can be foldable and can be adjusted.

Reference is made to FIG. 2 to FIG. 4 discloses a single automated coloring unit. The system for permeating color comprises of various modules, which can work in synchronization with each other as a single unit as well as a combination of multiple units working independently of each other undertaking different activities at the same time.

More specifically, FIGS. 2 A-C illustrate an example single automated coloring unit 200, according to some embodiments. The system discloses an autoclave 201, which acts as a pressure vessel which can dye frames with the color of own choice. The carrier 204 is a removable part, wherein three (3) different parts of one frame can be kept. The present invention further comprises of a lid assembly 202, which has automated opening and closing assembly with toggle clamping mechanism, working on pneumatic system. It further comprises of a robotic system for automatic loading and unloading of carrier(s) 204 and for transporting the carrier 204 for next operation. The ultrasonic transducer is used for agitation of dye bath. Thermocouples 213 present acts as temperature sensor. Pressure transducer or indicator is used for measurement of internal pressure of the autoclave. There exists a water level indicator for measuring the two different level of solution/fluid in each autoclave. A solenoid valve is used for controlling the feed, whereas pressure relief valve is used for safety. Gaskets are used to seal the Automated Lid Opening/Closing Assembly 203, whereas pumps can be used for water feeding. Piping assembly can be used for 8 transportation of liquid. Water tank is used for storage of hot water. The nozzles 207 can facilitate opening of feed system. The pneumatic cylinder is used for opening and closing assembly of the lid. PLC can be used for reliable control and ease of programming and process fault diagnosis. The band heater (e.g. heater assembly 205) with insulating jackets can be used for heating system. The non-return valves are used for better fluid control. Holder 206 can hold single automated coloring unit 200.

FIG. 3 illustrates an example cluster 300 of ten (10) autoclaves, according to some embodiments. Cluster 300 includes an ultrasonic machine 301 for the ten (10) autoclaves. Cluster 300 includes water tank with motor 302. Cluster 300 includes drainage tank 303. Cluster 300 includes ten (10) autoclaves such as autoclave 304. It is noted that in other examples n-number autoclaves can be included in system 300. Autoclaves are connected to water pipeline 305 via solenoid valve 306. Water pipeline 305 connects/drains from water tank with motor 302. Autoclaves are connected to sewage pipeline 307. Sewage pipeline 307 drains to drainage tank 303.

FIG. 4 illustrates an example schematic of feeding system 400, according to some embodiments. Feeding system 400 includes reservoir 401. Feeding system 400 includes hot water tank 402. Feeding system 400 includes chemical mixing tank 403. Feeding system 400 includes valve(s) 404. Feeding system 400 includes nozzles 405. Feeding system 400 includes autoclave 406. Feeding system 400 includes carrier 407.

Exemplary Methods

FIG. 5 illustrates an example process 500 for permeating color into components, according to some embodiments. In step 502, the substrates (e.g. parts) are manually placed inside the carrier and the carrier is placed inside ultrasonic cleaning tank. The ultrasonic cleaning machine is operated and two to three grams (2-3 gms) of NaOH can be added. The PH level is maintained between eight to ten (8-10) and continued till a specified time.

After ultrasonic cleaning, the carrier is transported with a robotic arm to the next station. In step 504, the carrier is then inserted into a washing tank for neutralization of substrate with water. The door/lid of autoclave is kept open and place the carrier inside with a robot system and close the door.

In step 506, warm water is fed into a channel of the washing tank up to a specified level (e.g. level one (1) of water 208, etc.). In step 508, steaming can be implemented (see infra). For example, once the desired value of psi pressure (e.g. $lbf/in^2$) is achieved, process 500 starts a count of time and maintains the same pressure for a pre-defined time period. The heater can then be turned off.

In step 510, after steaming, process 500 feeds the water up to another specified level (e.g. level two (2) of chemical mixed water 209 for dyeing, etc.).

In step 512, process 500 adds the dyestuff with the inclined hopper. The vibratory system is started along with a heater, when the pressure increases to fifteen (15) psi start count of time to five (5) minutes (e.g. maintain fifteen (15) psi pressure of steam during dyeing) and then turn off heater. The solution is cooled (e.g. up to forty to sixty (40-60) degrees, etc.) followed by stopping the vibratory system. The pressure is then released and the doors are kept open for picking the carrier and put into the washing tank with two to three (2 to 3) wash cycles. The solution is simultaneously drained through discharge valve. The autoclave is washed with water and cleaning liquid. In another embodiment, the plastic article is made up of a class of polyamide plastic that includes polyamide 11, polyamide 12 including its filled grade by using molded or selective laser sintered 3D printing process or by any additive manufacturing process. Other plastic or composite materials may also be used which formed using other additive processes are including stereo lithography and filament fusion techniques or Injection molded. The plastic article is cleaned 10 with bead blasting machine or pressurized compressed air (two to four (2 to 4) bar pressure) to remove un-sintered powder which gets stuck to parts while processing. Cleaned parts are polished in a vibratory tumbler or centrifugal finishing machine or disc finishing machine or sand papered or buffed depending upon final application and finish of the parts. Parts are loaded into individual carriers which are connected to a robotic arm that automatically takes the parts through the stages of the coloring process. The parts are submerged in an ultrasonic cleaning tank to remove the dirt, grease, oil etc. Ultrasonic cleaning is performed by using a twenty percent (20%) NaOH solution. The parts are fed into n-different carriers (e.g. twenty-five (25) different carriers, etc.) and placed inside separate pressurized vessels or autoclaves with the robotic arm for coloring the n-different shades (e.g. twenty-five (25) shades, etc.) of a same or a different color or mixture of colors.

It is noted that in step 508, parts are steamed in the closed vessel for predetermined period (e.g. five to one-hundred and twenty minutes (5 to 120 min)). The time period can be a function of the dye being used and the material properties of the parts. Color particles are added depending upon specified shades (Light, dark) between 0.5 μm to 100 μm with the specified auxiliaries (e.g. leveling agent, dispersing agent, wetting agent, buffer solution, fixing agent, scoring agent) to the solvent in n-different (e.g. 25 different, etc.) pressure vessels automatically. Coloring is performed under low pressure between ten to fifteen (10 to 15) psi pressure for predetermined period of time between five to one-hundred and eighty minutes (5 min to 180 min) at a temperature between fifty degrees Celsius (50° C.) to one-hundred and eighty degrees Celsius (180° C.) depending on the dye and auxiliaries used in the process as well as material properties of the part being colored.

The solution is allowed to cool between ten to one-hundred and twenty minutes (10 to 120 min) for conditioning the parts. The carriers are unloaded from the vessel and placed in the washing tank with the robotic arm to perform clean step 514. Two cycles of washing can be performed, one with hydro-mixed warm water (one of the bleaching system to remove the loose color particle) and second with cold or warm demineralized water.

After washing, the parts are unloaded from the carrier and placed into the drying chamber, in step 516, for predetermined time between ten to sixty minutes (10 min to 60 min). Drying temperature is set by considering temperature of the plastic parts. Drying is performed with infrared light, convection oven or vacuum oven to remove excess or entrapped moisture from the surface of the article.

An example embodiment of process 500 is now described. The plastic article is made up of selective laser sintering (SLS). This is an additive manufacturing (AM) technology that uses a laser to sinter powdered plastic material into a solid structure or article based on a molded or 3D model. This method work with a range of materials, including plastics, metals, glass, ceramics, and various composite material powders. Other plastic or material also be used which are formed by other additive manufacturing process (e.g. stereo lithography, filament fusion technique, injection molded, etc.). Different parts are fixed in the different carriers depending on which color to be done. The carriers are then moved to the next operation in the automated coloring machine with a robotic arm. Robotic arm is used to carry the carrier to the next station. The carrier is a metallic body with a handle designed to hold different parts for the ease of operation in the automatic coloring machine. The automated coloring machine consists of twenty-five (25) different autoclaves aligned in the rectangular form which are linked to each other with a different piping system for various purposes. Each autoclave has approximately ten-liter volumetric capacity and works below fifteen (15) psi internal pressure, as a result this is not come under any boiler act. The autoclave consists of nozzles for solvent and dyestuffs which work using an auto feeding system. Autoclave is equipped with different sensors and measuring instruments for ease of automation and safety consideration. The autoclave lid is closed automatically after keeping carrier inside. Lid opening and closing assembly 211 works on a toggle clamping mechanism with pneumatic system with substantially no pressure leakage. A pressure gauge can be located at opening for pressure gauge 212. Process 500 can inject the solvent into autoclave with automatic system up to desired level for steaming. Demineralized water is used as a solvent for steaming operation. Steam is generated inside the autoclave by heating the solvent at an elevated temperature, most preferably above one-hundred and twenty degrees Celsius (120° C.) and low pressure of steam is maintained, most preferably fifteen (15) psi. Process 500 can steam the parts for five (5) minutes to three (3) hours after reaching fifteen (15) psi of pressure inside the autoclave. Process 500 can release the steam pressure with a release valve to conduct next operation called dyeing. For the dyeing operation, process 500 can inject solvent to the next desired level (e.g. fully submerge article being dyed) with automatic system. Process 500 can insert the dyeing solution into solvent and mixed it with ultrasonic transducer. Ultrasonic transducer can have a frequency of around forty to fifty Hertz (40-50 Hz). The dye solution is prepared by mixing of dye particles with different auxiliaries. Each of different auxiliaries has its special purpose in the dyeing process. Dye particles can be the class of metal complex acid dyes, acid dyes, solvent dyes, reactive dyes, direct dyes. Auxiliaries can include, inter alia: levelling agent, dispersing agent, wetting agent, buffer solution, fixing agent, scoring agent, etc. The dye solution is injected into the solvent with an automatic injection system. Process 500 can heat the solution from fifty to one-hundred and eighty degrees Celsius (50° C. to 180° C.). In one example, this can be between ninety and one-hundred and twenty-five degrees Celsius (90° C. to 125° C.). Process 500 can maintain the pressure equal to and less than fifteen (15) psi for predetermined time between five to one-hundred and eighty (5 to 180 min). In one example, this can be between fiver to sixty minutes (5 to 60 min). More preferably between five to thirty minutes (5 to 30 min). Allow the solution to cool up to 50° C. and stopped the vibratory system. Process 500 can drain the dyeing solution with a drainage valve. Open the lid of autoclave, remove the carrier with the robotic arm and carry to the next station.

Process 500 can simultaneously clean (e.g. in step 514) the autoclave with the cleaning solution two to three (2 to 3) times. Process 500 can clean the dyed parts in the washing tank. Process 500 can remove the parts from the carrier and dry it in the hot air oven or in vacuum oven or with the infrared light for thirty to sixty minutes (30 to 60 min).

Figure 6:
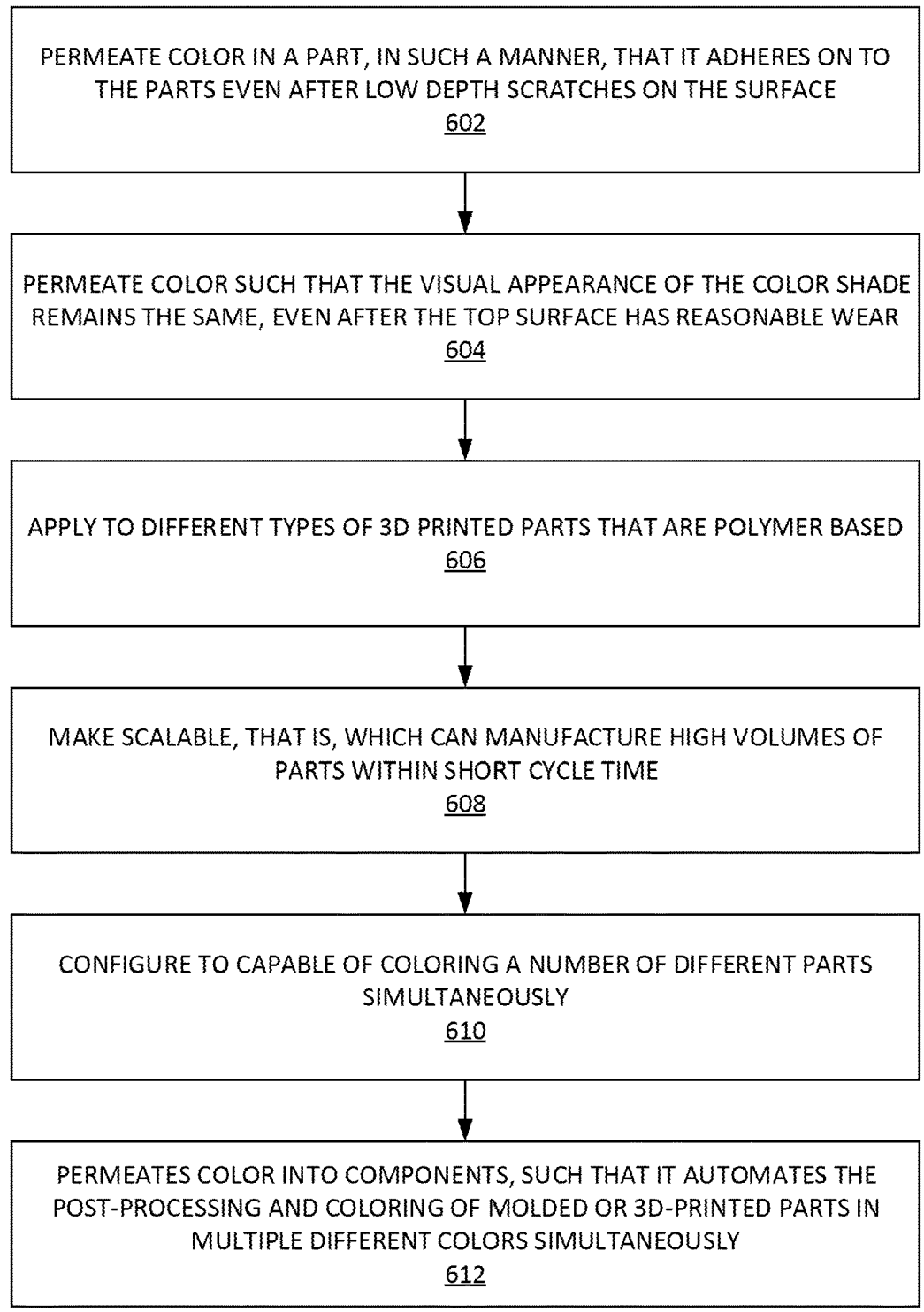
FIG. 6 illustrate an example process for permeating color into components, according to some embodiments.

FIG. 6 illustrate an example process 600 for permeating color into components, according to some embodiments. In step 602, process 600 permeates color in a part, in such a manner, that it adheres on to the parts even after low depth scratches on the surface. In step 604, process 600 permeates color such that the visual appearance of the color shade remains the same, even after the top surface has reasonable wear. In step 606, process 600 can be applied to different types of 3D printed parts that are polymer based, including 3D printed composite parts such as PAI 1, 12, aluminum filled polyamide, carbon filled polyamide etc. In step 608, process 600 is made scalable, that is, which can manufacture high volumes of parts within short cycle time. In step 610, process 600 is configured to capable of coloring a number of different parts simultaneously such as applications include eyewear, footwear, accessories, jewelry, furniture, lighting and other consumer products. In step 612, process 600 permeates color into components, such that it automates the post-processing and coloring of molded or 3D-printed parts in multiple different colors simultaneously.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method for permeating color into components comprising:
    placing substrates inside a carrier;
    placing the carrier inside an ultrasonic cleaning tank of an ultrasonic cleaning machine;
    performing an ultrasonic cleaning in the ultrasonic cleaning tank;
    after the ultrasonic cleaning, transporting the carrier with a robotic arm to a washing tank; inserting, with the robotic arm, the carrier into the washing tank and neutralizing a substrate with water in the washing tank;
    feeding warm water into a channel of the washing tank up to a specified level;
    steaming the washing tank for a specified steaming time;
    after steaming, feeding the water up to another specified level;
    after the specified steaming time, cooling the solution;
    adding a dyestuff with an inclined hopper;
    and after cooling the solution, adding a dyestuff with an inclined hopper, wherein the dyestuff comprises one or more dye color particles based on a set of specified shades and one or more auxiliary agents, wherein adding of the dye color particles is performed under a specified pressure for a specified period of time which is determined based on the dye color particles and the auxiliary agents.

2. The method of claim 1, wherein two to three grams of NaOH are added to the ultrasonic cleaning tank.

3. The method of claim 2, wherein a pH of 8-10 is maintained in the ultrasonic cleaning tank for a specified time.

4. The method of claim 1, wherein the one more auxiliary agents are selected from the group consisting of a leveling agent, a dispersing agent, a wetting agent, a buffer solution, a fixing agent, and a scoring agent.

5. The method of claim 1, wherein cooling the solution is performed for 10-120 minutes.

* * * * *